May 7, 1957     H. W. DIETERT ET AL     2,791,120
SAND CONTROLLER
Filed July 28, 1952     3 Sheets-Sheet 1
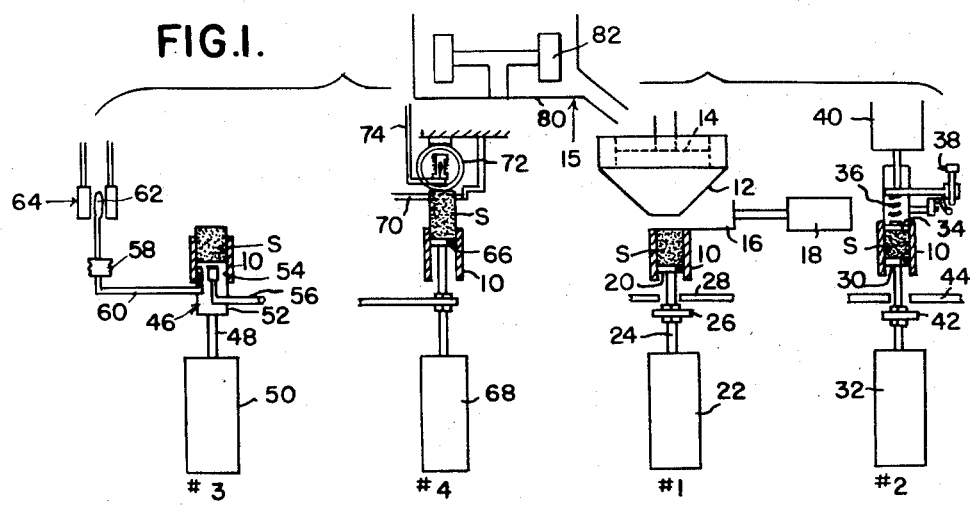
FIG.I.
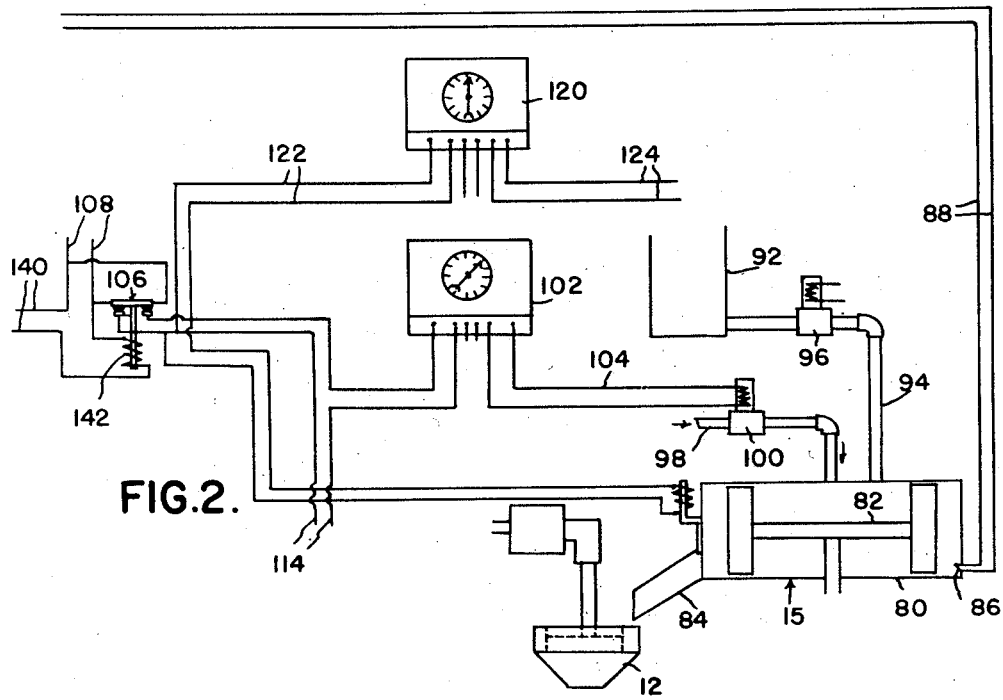
FIG.2.
*INVENTORS*
HARRY W. DIETERT
RANDOLPH L. DIETERT
RALPH E. STEINMUELLER
BY
*Whittemore, Hulbert*
*& Belknap* ATTORNEYS

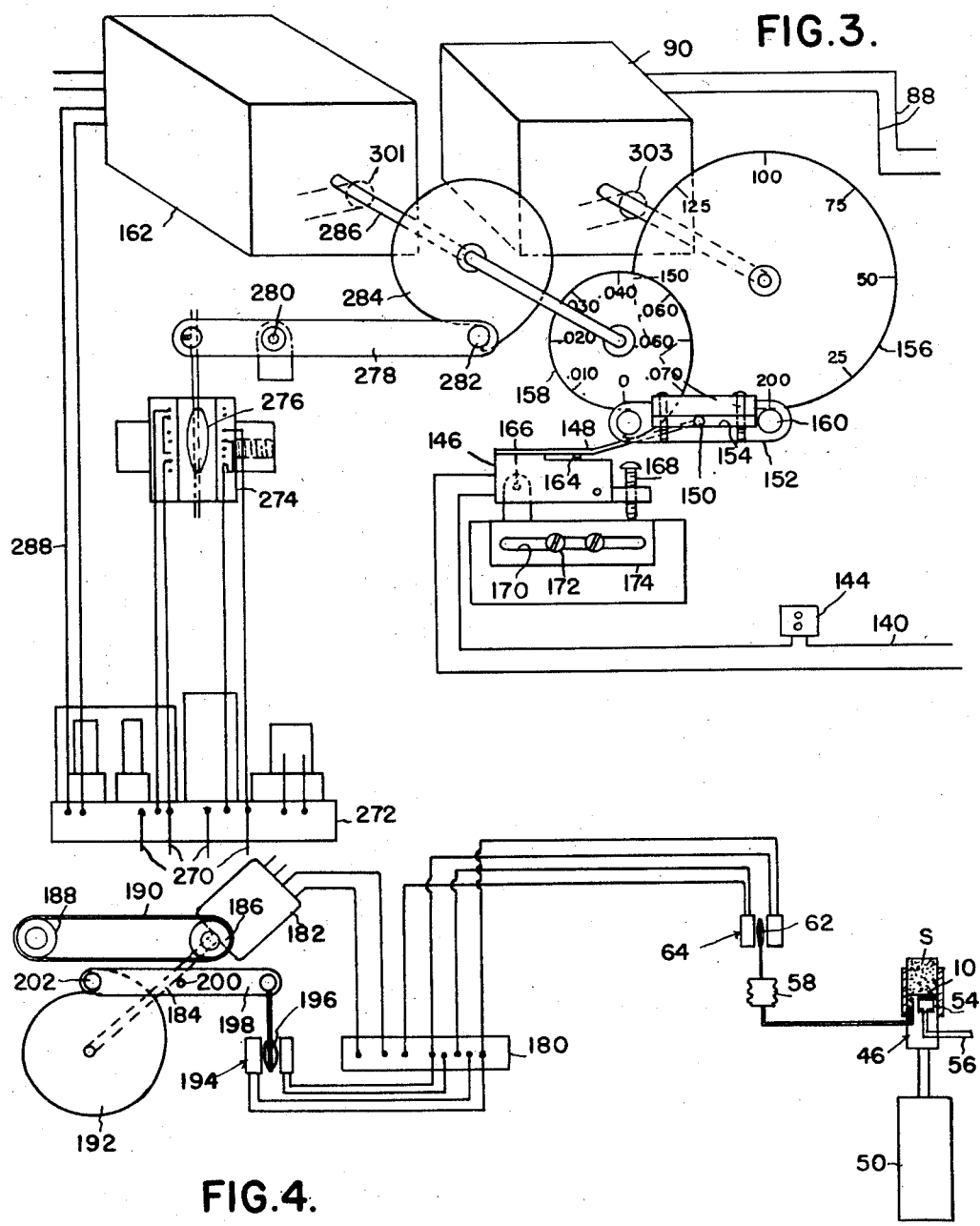

May 7, 1957 H. W. DIETERT ET AL 2,791,120
SAND CONTROLLER
Filed July 28, 1952 3 Sheets-Sheet 3
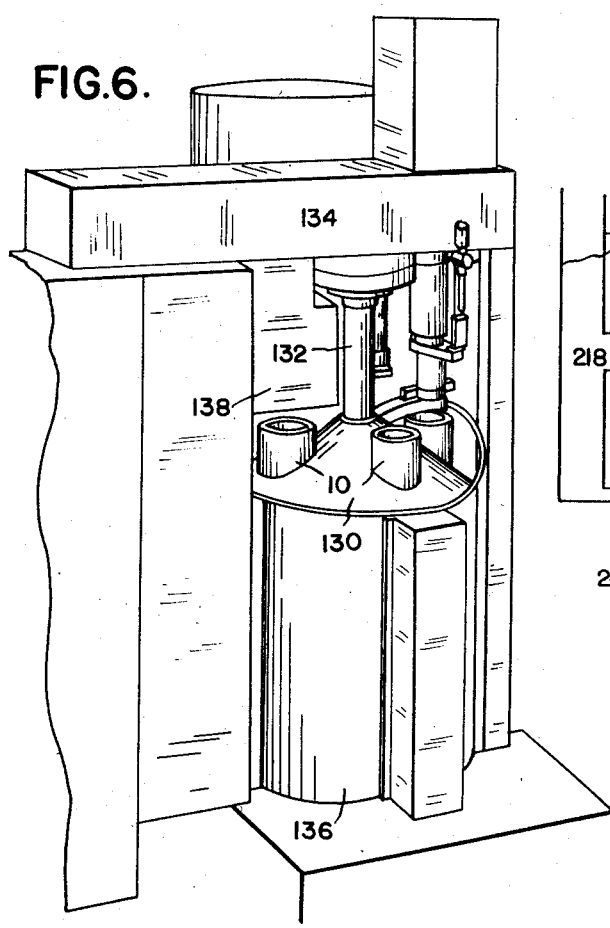
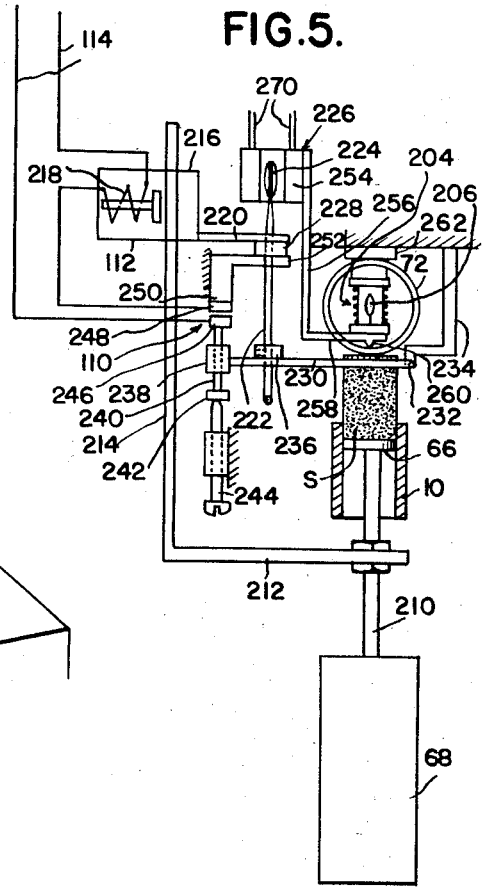
INVENTORS
HARRY W. DIETERT
RANDOLPH L. DIETERT
BY RALPH E. STEINMUELLER
Whittemore, Hulbert
& Belknap ATTORNEYS

United States Patent Office 2,791,120
Patented May 7, 1957

2,791,120
SAND CONTROLLER

Harry W. Dietert, Randolph L. Dietert, and Ralph E. Steinmueller, Detroit, Mich., assignors to Harry W. Dietert Company, Detroit, Mich., a corporation of Michigan Application July 28, 1952, Serial No. 301,294

25 Claims. (Cl. 73—432)

The present invention relates to apparatus for testing certain physical properties of molders' sand, recording some of the properties of the sand, and automatically adding water to a batch of sand to bring about desired changes in the physical properties of the moist sand.

More specifically, it is an object of the present invention to provide fully automatic apparatus for preparing a specimen of tempered sand in accordance with specifications of the American Foundry Society, testing and recording permeability of the specimen, measuring green deformation or strength of the specimen, measuring the temperature of the moist sand from which the specimen was prepared and controlling the addition of water to the batch of sand in accordance with the integrated result of the temperature of the batch of sand and the green deformation or strength of the specimen.

It is a further object of the present invention to provide apparatus for depositing moist sand in a specimen tube, compressing the sand in the tube, thereafter partially expelling the compressed specimen from the tube to leave a predetermined length of specimen in the tube, thereafter subjecting the interior of the tube to air pressure and measuring passage of air through the specimen, thereafter projecting a predetermined length of specimen from the tube and subjecting the projected length of the specimen to disruptive forces while measuring deformation and strength of the projected portion of the specimen.

More specifically, it is an object of the present invention to provide apparatus for automatically sequentially introducing moist sand into a plurality of specimen tubes, sequentially compressing the sand in the specimen tubes, sequentially expelling a portion of the specimen from the tubes to leave a predetermined length of the sand specimen remaining in the tube, and thereafter testing the permeability of the sand specimen remaining in the tube by measuring air passage through the specimen, sequentially projecting a predetermined length of the specimen beyond one end of the tubes, and subjecting the projected length of the specimen to disruptive pressure while measuring the deformation and strength of the sand specimen.

It is a further object of the present invention to provide automatic apparatus for tempering sand which includes means for measuring the temperature of the batch of sand, and means for measuring green deformation of test specimens of the sand, integrating the values of temperature and green deformation and controlling the addition of water to the batch of sand in accordance with the resulting integrated values.

It is a further object of the present invention to provide automatic apparatus for tempering sand which includes means for measuring the temperature of the batch of sand, and means for measuring green strength of test specimens of the sand, integrating the values of temperature and green strength and controlling the addition of water to the batch of sand in accordance with the resulting integrated values.

It is a further object of the present invention to provide automatic apparatus for tempering sand which includes means for measuring the workability of the sand, and means for controlling the addition of water to the sand in accordance with its measured workability.

It is a further object of the present invention to provide sand tempering apparatus comprising a rotary support having thereon a plurality of specimen tubes, a plurality of circumferentially separated stations around which the specimen tubes advance, said stations comprising a loading station, a compressing station, a station for testing permeability of a specimen of compressed sand, and a station for testing green deformation and strength of a sand specimen.

Other objects and features of the invention will become apparent as the description proceeds, especially when taken in conjunction with the accompanying drawings, wherein:

Figure 1 is a more or less diagrammatic view showing the functional parts of the apparatus employed in tempering the sand.

Figure 2 is a fragmentary schematic view showing a part of the mechanism for controlling the addition of water to the sand.

Figure 3 is a fragmentary schematic view showing an additional part of the mechanism for controlling the addition of water to the sand.

Figure 4 is an enlarged schematic view partly in section showing the mechanism for measuring and recording permeability of the sand specimen.

Figure 5 is an enlarged schematic view partly in section showing the mechanism for measuring green deformation of the sand specimen.

Figure 6 is a fragmentary perspective view of the apparatus for tempering sand.

In the past, experienced molders added water to molding sand to obtain a certain "feel" which depended upon the plasticity of the moist sand or its green deformation. It is known that if green deformation is accurately measured and is held constant, the sand will always feel the same to the molder. This results in better production since the sand always molds the same. However, additional water is required to be added to the sand mix under high temperature conditions to compensate for evaporation. Accordingly, to maintain the proper "feel" or plasticity, or green deformation of molding sand the actual percentage of moisture in the sand has to be varied in accordance with measured green deformation of the sand in conjunction with the temperature of the batch. At the same time it is desirable to measure the permeability and strength of these specimens.

Standards set by the American Foundry Society set forth the manner in which a test specimen of sand should be prepared; namely, the length and diameter of a cylindrical sample, the pressure to which the sample is subjected in compressing it, the permeability of the sand to air under pressure, the strength, and the deformation or change in length of a specimen in response to gradually increasing pressure applied to disrupt the specimen.

Described in general terms, the present invention provides apparatus which is fully automatic in character and which carries out the tests in accordance with the standards set forth by the American Foundry Society, measures permeability, green strength, green deformation of the sand specimen and the temperature of the batch, and controls the addition of water to the batch of sand in accordance with the integrated measurements of green deformation or green strength of a test specimen and the temperature of the batch.

Referring now to Figure 1 there is illustrated a specimen tube 10 open at its top and bottom and which in the position designated as station #1 is located beneath a riddle 12 into which moist sand is discharged. A motor driven stirrer 14 causes sand to pass through the riddle.

A large sand mill 15 discharges a small stream of sand into the riddle 12. Associated with the tube 10 and riddle 12 is a cut-off blade 16 actuated by an air cylinder 18 and adapted to control the amount of sand deposited in the specimen tube 10. The lower end of the specimen tube is closed by a piston 20 actuated by an air cylinder 22, the piston rod 24 being provided with an adjustable stop 26 associated with fixed abutments 28 to determine the amount of sand deposited in the test specimen at station #1. It will be appreciated that in accordance with the character of the sand and other circumstances, more or less sand may be required to be deposited in the specimen tube to produce compressed test specimens of the permissible lengths.

At station #2 the sand in the specimen tube 10 is compressed between a lower piston 30 operated by an air cylinder 32, and an upper piston 34 biased downwardly by an adjustable compression spring 36. Means for adjusting the pressure of the spring 36 is shown generally at 38. An air cylinder 40 is provided above the specimen tube 10. It will be appreciated that air pressure applied by the cylinders 32 and 40 result in compression of the sand in the tube 10 to a degree determined by the strength of the spring 36. Thus, a test specimen is prepared by the application of a predetermined pressure. Moreover, this test specimen is of the prescribed diameter and as will subsequently appear, is preferably slightly longer than the test specimen as set forth by the standards of the American Foundry Society, namely two inches plus or minus 1/32. At this station following the application of the predetermined pressure to the test specimen, the lower piston 30 is moved upwardly to a position determined by engagement between the adjustable abutment 42 and the fixed abutments 44, at which time a predetermined length of test specimen remains within the tube 10. In accordance with the standards of the American Foundry Society, the diameter of the tube 10 is two inches and the length of test specimen remaining in the tube following elevation of the piston 30 is two inches.

The test specimen S is now moved to station #3 where the permeability of the test specimen S is measured. This is accomplished by elevating to a position within the lower end of the specimen tube 10 a test unit indicated generally at 46. This test unit is connected by a piston rod 48 to the piston of an air cylinder 50 and includes a cup-like member 52 preferably provided with a sealing ring as indicated at 54. Elevation of the cup 52 in sealed relation with the inner surface of the specimen tube 10 operates as a piston and compresses air within the cup 52. In order to test permeability of the portion of the test specimen S remaining in the specimen tube 10, air is admitted into the cup 52 through an orificed conduit 56. It is found that the portion of the test specimen S which projects above the upper end of the specimen tube 10 does not affect the permeability test within practical limits and the results are the same as if air pressures were applied to a test specimen of a length equal to the portion of the actual specimen S remaining in the specimen tube. Air pressure within the cup 52 is effective on a bellows 58 through a conduit 60 and increase in air pressure results in elevation of the armature 62 of a differential transformer indicated generally at 64.

The differential transformer 64 is of the type available on the open market under the trade name "Atcotran" and is adapted to develop an output current variable in magnitude and direction in accordance with the position of the core or armature 62 therein. The differential transformer normally contains clockwise and counter-clockwise wound field coils in conjunction with a primary coil. The output of the transformer is transmitted to an amplifier and is employed to position a permeability indicator as will subsequently be described in detail.

Following the test of permeability of the specimen S, the specimen is next subjected to pressure for the purpose of determining its green deformation and strength. For this purpose a piston 66 is elevated by an air cylinder 68 to cause a predetermined length of test specimen to project above the upper end of the specimen tube 10. In the present case where the apparatus is designed to carry out tests in accordance with standards set up by the American Foundry Society, the structure is arranged to cause two inches of the test specimen to project from the top, at which time the upper end of the test specimen engages a lever 70 connected to the underside of a standard proving ring 72 used to measure deformation and strength of the specimen S under pressure. The proving ring mechanism 72 is of standard type but includes means later to be described which adapts it for use with the present apparatus. Deformation of the proving ring 72 results in upward movement of an arm 74 which carries the armature or core of a second differential transformer which is connected to mechanism effective to measure green deformation of the test specimen. The load carrying capacity of the sand also causes the proving ring to compress which moves an armature within a differential transformer upward. This in turn results in a change in current flow which operates a recorder to show the strength of the sand, as will later be described in detail.

Referring now to Figure 2 there is illustrated a container 80 which is provided with a rotary mixer 82. Sand within the container 80 flows through a discharge conduit 84 to the riddle or hopper 12 previously described. A thermocouple 86 is provided in the container 80 for the purpose of measuring the temperature of the sand therein and the thermocouple 86 is connected by wires 88 to actuating mechanism 90 for a temperature indicator as seen in Figure 3. A water tank 92 is provided which contains a predetermined amount of water to be added to the sand in the container 80 for initial moistening of the sand. The amount of water provided in the tank 92 is such as to provide between 60 and 80% of the estimated water requirement to temper the sand in the container 80. The tank 92 is connected by an outlet line 94 controlled by a valve 96 and upon initiation of operation the valve 96 is opened to discharge a predetermined quantity of water into the container 80.

In accordance with the present invention additional quantities of water are added periodically to the container 80 until the sand is tempered to the desired degree. For this purpose a water line 98 is provided which is adapted to discharge into the container 80. The line 98 includes a solenoid controlled valve 100 and the valve 100 is in turn controlled by an electric timer 102 through lines 104. The timer 102 is set to energize solenoid valve 100 to open the same for a predetermined spaced interval such for example as three to five seconds, to permit water to flow into the tank. The timer 102 is controlled by a master switch 106 connected to power lines 108. The operation of the timer 102 is initiated, when the master switch 106 is closed, by closure of the contacts of a trigger switch 110 seen in Figure 5. The trigger switch 110 is connected in series with a clamping solenoid 112 later to be described by conductors 114 seen both in Figures 2 and 5. It is thus apparent that the control means for initiating operation of the timer is in series with the clamping solenoid 112 and the trigger switch 110. The operation of the apparatus involves closure of the trigger switch 110 at each time a new sand specimen S is tested for green deformation and strength by the proving ring 72. The length of time which the solenoid valve 100 is open is dependent solely on the setting of the timer 102 and is independent of the duration of closure of the contacts of the trigger switch 110.

Means are provided for continuing operation of the testing apparatus after the sand has reached its proper condition so as to clear the apparatus for testing of a subsequent batch of sand. For this purpose a sand controller purging timer 120 is provided having a control circuit 122 under the control of the master switch 106 and controls a circuit 124 which continues to operate a blower (not shown) for supplying air to the permeability meter, the air cylinders of the apparatus, the testing mechanisms of the permeability, strength and deformation. Thus, after the sand in the container 80 has been properly tempered the test apparatus continues to operate to clear itself of specimens of that particular batch of sand in readiness for testing of a subsequent batch. In practice the purging timer 120 may be set to run for approximately 45 seconds after the master switch 106 opens.

The description of the apparatus so far described has been in more or less general terms without reference to the specific structure of the testing apparatus. Reference is now made to Figure 6 to illustrate a preferred form of physical embodiment of the testing apparatus. As seen in this figure, the specimen tubes 10 are four in number and are mounted on a rotary carrier member 130. The carrier member 130 is connected by a shaft 132 to suitable indexing mechanism (not shown) within a housing 134. The index mechanism is adapted to index the carrier member 130 ninety degrees following completion of the operations at each of the four stations. The apparatus includes a housing 136 within which the lower air cylinders and the mechanism carried thereby are mounted. As seen in Figure 6, the specimen tube seen at the right of the figure is at station #2, the middle tube is at station #3, and the left hand tube is at station #4. The tube at station #1 is not seen in this figure. It will be appreciated that the housing 138 in Figure 6 contains the proving ring 72 and associated mechanism.

Referring now to Figure 3 there is illustrated mechanism which controls the master switch 106 through conductors 140, these conductors being illustrated in Figure 2 as connected to the winding 142 of the master switch 106. The circuit includes a starting relay 144 and a deformation-temperature trip switch 146. The switch 146 includes a movable resilient contact 148 having a pin 150 at its free end connected to an integrating block 152. The pin 150 may be adjusted longitudinally of a slot 154 in the block so as to vary the relative effectiveness of a temperature cam 156 and a deformation cam 158. The temperature cam 156 is positioned by the actuator 90 in accordance with the temperature of the sand in the container 80. The integrating block 152 includes a roller 160 which engages the periphery of the temperature indicating cam 156.

By mechanism subsequently to be described, the deformation cam 158 is positioned by a servomotor 162 to a position corresponding to the deformation reading of the test specimen being tested. When the integrating block 152 reaches a position resulting from proper deformation of the specimen for its particular temperature, contact 148 is lifted from stationary contact 164 and the winding 142 of the master switch 106 is de-energized, thus terminating a cycle except for the further actuation control of the purging timer to clear the apparatus of sand from the batch tested. The switch 146 is mounted for rocking movement about a pivot pin 166 and its position may be determined by an adjusting screw 168. At the same time the location of the pin 150 in the slot 154 may be varied by longitudinal adjustment of the switch 146 provided by the adjusting slot 170 and clamping screws 172 associated with the adjustable switch supporting block 174. Thus, the control may be selectively rendered more responsive to temperature or deformation asdesired, and the particular cut-off point adjusted by varying the height of the switch 146 through adjustment of the screw 168. As will subsequently be described, cam 158 may be positioned by means responsive to green strength, rather than green deformation, as may be desirable for some purposes.

Referring now to Figure 4, the mechanism for measuring and recording permeability of the test specimen is shown in somewhat greater detail. In this figure the cylinder 50 is illustrated as having elevated the permeability test unit 46 into the lower end of the specimen tube 10. Air is introduced through conduit 56 through a small gold orifice as provided in accordance with American Foundry Society standards. This air is under pressure of 10 centimeters of water. Air escapes through the specimen S and in accordance with the permeability of the specimen and the air pressure within the test unit 46 builds up and raises the armature or core 62 of the differential transformer 64 as a result of expansion of the bellows 58. Upward movement of the core 62 develops an output current from the unit which is led to an amplifier 180, the output of the amplifier 180 being connected to a motor 182. The motor 182 has a shaft 184 to which is connected a pulley 186. A second pulley 188 is provided and a steel wire 190 connects the pulleys and operates a recording device. In addition, the shaft 184 is connected to a cam 192. Another differential transformer 194 is provided having its output connected to the amplifier 180 in such relation as to buck the output of the differential transformer 64. The movable core 196 of the differential transformer 194 is connected to a lever 198 pivoted as indicated at 200 and having a roller 202 engageable with the periphery of the cam 192. The arrangement is such that the cam 192 and steel wire or tape 190 are moved to positions in accordance with the instantaneous position of the core 62 of the differential transformer 64.

Referring now to Figure 5 details of the operation of the mechanism for testing strength and deformation of the sand specimen will be described. Separate means are provided for determining the green strength and green deformation of the specimen. Deformation of the specimen under pressure applied thereto in an axial direction is determined by distortion of the proving ring 72. The proving ring is as prescribed by the standards of the American Society of Testing Materials and will not be described in detail here. A differential transformer 204 having a core or armature part 206 is positioned within the ring, the windings of the differential transformer being stationary and the armature 206 movable vertically as the ring is compressed. Thus the differential transformer output varies in accordance with ring compression, and is used in conjunction with an amplifier and servomechanism to actuate a recorder, the scale of which reads in pounds per square inch.

Means are also provided for determining green deformation, which is a measure of the shortening of the specimen in .001 inch per inch of length under the applied load.

Carried by the piston rod 210, which is connected to the piston 66, is a bracket 212 including a vertically extending rod 214. Associated with the rod 214 is a solenoid actuated clamping device 216, the winding 218 of which is in series with the contacts of the trigger switch 110 as previously described. When the windnig 218 is energized the clamping device 216 engages the rod 214 so that further upward movement of the piston 66 and the lower end of the sand specimen S results in upward movement of the clamping device 216.

The clamping device 216 has an extending arm 220 having an opening through which extends a rod 222 carrying the core or armature element 224 of a differential transformer 226. Mounted on the rod 222 is a collar 228 which engages the underside of the arm 220 and thus permits upward movement of the rod 222 only upon upward movement of the clamping device 216.

Associated with the proving ring 72 is a lever 230 which is pivoted as indicated at 232 from a bracket 234. The lever 230 includes a wide platen portion overlying the sand specimen S which is engaged by the upper surface of the sand specimen. Mounted on the rod 222 is a light friction collar 236. It will be observed that the collar 236 is located outwardly from the pivot point 232 a distance substantially greater than the distance between the pivot point and the sand specimen. Accordingly, the collar 236 is moved upwardly at a rate greatly in excess of the upward movement of the upper end of the sand specimen.

At its outer end the lever 230 carries a light friction sleeve 238 which engages a rod 240. At its lower end the rod 240 is provided with a head 242 engageable with the end of a setting or adjusting screw 244. At its upper end the rod 240 carries the lower contact 246 of the trigger switch 110. The upper contact 248 of the trigger switch is fixed and is shown as mounted on a fixed bracket 250 which includes a laterally extending arm 252 which serves as an abutment for the collar 228 in its lowermost position.

The differential transformer 226 includes a part 254 carrying the windings and this part 254 is mounted on a bracket 256 which includes a laterally extending arm 258 having a point 260 resting on the inner surface of the proving ring 72 at the bottom thereof. Since the upper end of the proving ring rests against a fixed abutment 262 deformation of the proving ring results in upward movement of the winding portion 254 of the differential transformer.

It will be recalled that the strength and deformation test of the sand specimen requires that a predetermined length of the specimen shall project above the upper end of the specimen tube 10 and that when carrying out tests in strict accordance with the standards set up by the American Foundry Society two inches of the specimen are to project above the upper end of the specimen tube when pressure is applied to test deformation of the specimen. In order to insure proper relative movement between the winding part 254 of the differential transformer and the core or armature part 224 thereof, it is necessary to prevent relative movement between these parts prior to the application of pressure to the proving ring. This is accomplished by the mechanism previously described.

When the piston rod 210 moves upwardly the piston 66 moves the sand specimen upwardly until a predetermined amount, and in the present instance two inches thereof, projects above the upper end of the specimen tube 10. At this time the upper end of the sand specimen contacts the wide platen portion of the lever 230 and rocks the lever upwardly about its pivot 232. At this time the friction collar 236 urges the armature rod 222 upwardly but upward movement of the rod is prevented by engagement between the collar 228 and the arm 220 of the clamping device 216. Thus, the friction collar 236 rides upwardly on the rod 222. At the same time the friction collar or sleeve 238 moves the rod 240 upwardly, thus closing the trigger switch 110 by bringing contacts 246 and 248 together. This completes a circuit through the windings 218 of the solenoid clamping device. The initial upward movement of the piston rod 210 raised the bracket 212 and the vertical portion 214 of the bracket moved upwardly relative to the solenoid clamping device 216. Now, however, with the windings 218 of the solenoid clamping device energized further upward movement of the piston rod 210 results in corresponding upward movement of the clamping device 216. At this time the lever 230 is applying pressure to the proving ring and further clockwise rotation or upward movement of the lever 230 depends upon deformation of the proving ring 72. It will be appreciated that if the proving ring 72 were incompressible no further upward movement of the lever 230 would be permitted and as further upward movement of the piston 66 occurred, the arm 220 of the clamping device 216 would move away from the collar 228 on the armature rod 222. However, upward movement of the piston 66 results in a smaller or slower upward movement of the upper end of the sand specimen due to deformation of the specimen. Accordingly, while the specimen is being deformed under pressure applied by the air cylinder 68 it may be considered that its upper end is moving upwardly at a slower rate than its lower end. Upward movement of the upper end of the test specimen S results in deformation of the ring and accordingly results in upward movement of the winding portion 254 of the differential transformer at a rate equal to the rate of upward movement of the upper end of the specimen. At this time rocking movement of the lever 230 tends to move the armature rod 222 upwardly at a substantially greater rate due to the lever arm. However, upward movement of the armature rod 222 is limited by engagement between the collar 228 and the arm 220 so that actual upward movement of the armature rod 222 is at the same rate as the clamping device 216 which in turn moves upwardly at the same rate as the piston 66 or the lower end of the specimen. Accordingly, relative movement between the armature 224 and the winding portion 254 of the differential transformer is prevented until the trigger switch 110 closes and thereafter takes place at a rate equal to the difference between the rates of upward movement of the upper and lower ends of the test specimen. In other words, the instantaneous displacement of the armature 224 during deformation of the test specimen represents the instantaneous deformation or shortening of the test specimen.

When the test specimen ruptures the proving ring 72 expands, moving the lever 230 downwardly and opening the contacts of the trigger switch 110. This deenergizes the solenoid clamping device 216 which moves the armature rod 222 downwardly until the collar 228 abuts the arm 252. At the same time the winding portion 254 of the differential transformer moves downwardly, thus restoring the relatively movable elements of the differential transformer to their null or zero position.

The mechanism just described solves the difficult problem of measuring green deformation, which is expressed in .001″, while setting the deformation measuring mechanism in action at the proper time. It is possible to set the mechanism to close contacts 246, 248 at the proper time, thus actuating clamping unit 254 and starting to measure green deformation at effectively zero.

It will be recalled that closing of the trigger switch initiated operation of the timer 102 which admitted water through the pipe 98 to the mixing container 80 for an interval determined by the setting of the timer.

The differential transformer 226 has output lines indicated generally at 270, which as seen in Figure 3 are connected to an amplifier 272. Also connected to the amplifier 272 is another differential transformer 274, the windings of which are connected to the amplifier 272 in bucking relation to the output of the differential transformer 226. The differential transformer 274 includes a core or armature 276 carried by a lever 278 pivoted as indicated at 280 and having a roller 282 engageable with a cam 284. The cam 284 is mounted on a shaft 286 of the servomotor 162, the shaft 286 also mounting the cam 158 previously described. The output of the amplifier 272 is connected to the servomotor 162 by conductors indicated at 288. The arrangement is such that when the differential transformer 226 is unbalanced by relative movement between its armature and windings an amplified output is transmitted to the servomotor 162, thus rotating the cam 284 and rocking the lever 278. This has the result of displacing the core or armature 276 of the differential transformer 274 and motion of the motor is continued until the output of the differential transformer 274 nullifies or counterbalances the output of the differential transformer 226. Actually in practice, continued motion of the armature 224 results in a follow-up movement of the armature 276 as a result of rotation of the cam 284 and the cam 158 thereby represents instantaneous deformation of the test specimen during the test.

The contacts 148 and 164 of the switch 146 are normally closed but open when the deformation of the test specimen reaches a desired amount, thereby opening the master power switch 106 (Figure 2) and terminating automatic cycling of the apparatus.

It will be appreciated that operations are taking place simultaneously at the four stations of the apparatus. At the first station sand is being introduced into the specimen tube through the riddle or hopper 12. At this time sand is being rammed at station #2 between the pistons 30 and 34 following which the rammed specimen of sand is elevated until a predetermined amount, as for example two inches, remains in the tube. At station #3 the specimen is being tested for permeability. At station #4 the specimen is tested for strength or green deformation. Following completion of the operations at all of the four stations the carrier member 130 is indexed ninety degrees and a second specimen of sand is tested.

It will of course be apparent that the specimens of sand at the several stations each include different amounts of moisture since water was added to the mixing container 80 at each cycle of the apparatus. This means that sand in the mixing container 80 contains a higher percentage of moisture than the sand in the specimen tube at the 4th station, where the sand is being tested for strength and deformation. However, it is only necessary to control the settings of the switch 146 in order to allow for the fact that the specimen which is actually controlling the cam 158 contains less moisture than the sand in the container 80.

The present apparatus is fully automatic in character and requires only closure of the starting relay 144 to initiate automatic operation. The valve 96 which controls the initial addition of water to sand in the mixing container 80 may be separately controlled or may be tied-in to the circuit. The apparatus operates to take test specimens of sand at relatively rapid intervals and to make uniform additions of water to the sand in the mixing container at each test. This periodic addition of water continues until the sand is tempered by the addition of water to the degree required to open the contacts 148 and 164 of the switch 146. This instantaneous interruption of the circuit de-energizes the starting relay 144 and terminates the cycle except for the continued operation under control of the purging timer 120.

Recording apparatus similar to the permeability recorder may be employed in conjunction with shaft 286 and the shaft carrying the temperature cam 156. This will include sheaves 301 and 303 which operate styluses movable across a movable record element.

While a preferred embodiment of the apparatus has been described in detail, it will of course be understood that the actual control of additional water to temper the material may be controlled by other factors. Thus, the addition of water may be made dependent solely on green deformation. Alternatively, the green strength measuring differential transformer 204 could be connected to amplifier 272, so that control of additional tempering water becomes dependent on the integrated result of temperature and green strength. Alternatively, with the last arrangement, temperature response could be eliminated, and the addition of water made solely dependent on green strength of the specimen. Finally, for some purposes it may be desirable to make the addition of water dependent on the integrated result of both green strength and green deformation. This could be accomplished by using the output of strength differential transformer 204 to position a strength cam similar in operation to the green deformation cam 158.

The green strength and the green deformation of the specimen are significant physical properties which determine its moldability or its workability, and where the term workability is used herein, it is intended to define the physical properties determined by both green strength and green deformation of the specimen.

The drawings and the foregoing specification constitute a description of the improved sand controller in such full, clear, concise and exact terms as to enable any person skilled in the art to practice the invention, the scope of which is indicated by the appended claims.

What I claim as my invention is:

1. A sand controller comprising a sand container, means for adding water to the container, a specimen tube open at both ends, a filling station provided with means for discharging a predetermined amount of sand from the container into said tube; a ramming station provided with means for ramming the sand in the tube to produce a compacted specimen including means for moving the specimen partly out of one end of the tube to leave a predetermined length of specimen in the tube; a permeability testing station provided with means including an orifice for admitting air to the other end of the tube and confining it therein and means for measuring air pressure within the tube; a deformation and strength measuring station provided with means for moving said specimen further out of said tube to cause the same predetermined length of specimen to project beyond the end of said tube, means for applying pressure longitudinally of said specimen to break the specimen, and means for measuring deformation and strength of said specimen under pressure; a carrier for said tube and means for indexing said carrier to move said tube successively from said filling station to said ramming station to said permeability testing station to said deformation and strength measuring station and back to said filling station.

2. Apparatus as defined in claim 1 in which said carrier is rotatable and has means thereon for supporting a tube at each of said stations.

3. Apparatus as defined in claim 1 in which the means for adding water comprises a valve, means for measuring the temperature of sand in the container, and control means responsive jointly to the temperature of the sand and the deformation to control the valve to add water to the sand if the combined deformation and temperature measurement indicate a water deficiency.

4. Apparatus as defined in claim 1 in which the means for adding water comprises a valve, means for measuring the temperature of sand in the container, and control means responsive jointly to the temperature of the sand and the strength to control the valve to add water to the sand if the combined strength and temperature measurement indicate a water deficiency.

5. Apparatus as defined in claim 3, said control means comprising a valve, a timer controlling said valve and effective when operated to hold said valve open for a predetermined interval, means responsive to each initiation of operation of said deformation measuring means to initiate operation of said timer while a water deficiency continues, and means to terminate operation of said timer when the water deficiency is overcome.

6. A sand controller comprising a base, a rotary carrier on said base, a filling station, a ramming station, a permeability testing station, and a deformation-strength measuring station on said base spaced around said carrier, a specimen tube on said carrier, means for indexing said carrier to move said tube sequentially from station to station, vertically movable pistons at each station movable into and out of the lower end of said tube, means at said filling station for introducing sand into said tube, an upper piston at said ramming station movable into the upper end of said tube to compress the sand against the lower piston thereat, means at said ramming station for thereafter raising said lower piston to elevate the specimen partly out of said tube to leave a predetermined length of specimen in said tube, the piston at said permeability testing station including an orificed air inlet and means for measuring air pressure in said tube below said specimen, means at said deformation-strength station for elevating the lower piston at said station to raise the specimen until a predetermined length of specimen projects above said tube, a proving ring against which the upper end of the specimen is pressed, and means for measuring deformation and strength of said ring.

7. Apparatus as defined in claim 6 in which said carrier is provided with four tubes angularly spaced so that one tube is located at each of said four stations.

8. Apparatus for producing a moist mixture of foundry sand comprising a mixer, a tank including discharge means leading to said mixer, means for measuring and retaining a definite quantity of liquid in said tank for supplying a first addition of liquid to said mixer, a liquid supply line leading to said mixer including a solenoid controlled valve for making further additions of liquid to said mixer, means for repeatedly withdrawing successive moist samples of mixed materials from said mixer, means for compressing a specimen of said material and determining its deformation, and means responsive to the deformation of said specimen for opening said solenoid valve so long as the determination of deformation of said specimen indicates a liquid deficiency.

9. In apparatus of the class described, a specimen tube, a piston movable within said tube toward one end thereof, a deformation-strength measuring device located a predetermined distance outwardly beyond said one end of said tube, means for moving said piston toward said device to compress a rammed sand specimen between said device and piston, and measuring means for measuring directly relative movement between said piston and the part of said device engaged by the specimen.

10. Structure as defined in claim 9 in which said measuring means comprises a differential transformer comprising relatively movable armature and winding parts, means for preventing relative movement between said parts prior to engagement between the sand specimen and said device, and means for thereafter moving one of said parts in accordance with movement of said piston and the other of said parts in accordance with movement of the part of said device engageable by the specimen.

11. A specimen tube, a piston movable therein, a proving ring located outwardly beyond one end of said tube, a lever engaging the side of said ring adjacent said tube, a differential transformer including relatively movable winding and armature parts, a rod carrying one of said parts, a friction collar on said lever engaging said rod, a fixed collar on said rod, an abutment member engaging said fixed collar, a member carried by said piston and movably engaging said abutment member, a clutch on said abutment member, means responsive to movement of said lever to engage said clutch to thereafter cause said abutment to move with said piston, and means carrying the other of said parts for movement with the portions of said ring engaged by said lever.

12. Deformation testing apparatus comprising a strength measuring unit, a member for moving a sand specimen toward said strength measuring unit, a lever having a portion interposed between said strength measuring unit and member, a first rod movable with said member, an abutment block slidable on said rod, a clutch between said block and rod, a second rod, a friction collar on said second rod, a fixed collar on said second rod engageable with said abutment block, means for measuring shortening of the specimen under compression including relatively movable parts, one of said parts being carried by said second rod and movable by said lever in accordance with movement of said abutment block, means supporting the other of said parts for movement in accordance with deformation of said strength measuring unit, and means responsive to movement of said lever to engage said clutch.

13. Apparatus as defined in claim 12 in which said clutch comprises a solenoid, and said last means comprises a switch controlling said solenoid and actuated by movement of said lever.

14. A sand controller comprising a base, a rotary carrier on said base, a filling station, a ramming station, and a deformation-strength measuring station on said base spaced around said carrier, a specimen tube on said carrier, means for indexing said carrier to move said tube sequentially from station to station, vertically movable pistons at each station movable into and out of the lower end of said tube, means at said filling station for introducing sand into said tube, an upper piston at said ramming station movable into the upper end of said tube to compress the sand against the lower piston thereat, means at said deformation-strength station for elevating the lower piston at said station to raise the specimen until a predetermined length of specimen projects above said tube, a proving ring against which the upper end of the specimen is pressed, and means for measuring deformation and strength of said ring.

15. A sand controller comprising a sand container, means for adding water to the container, a specimen tube open at both ends, a filling station provided with means for discharging a predetermined amount of sand from the container into said tube; a ramming station provided with means for ramming the same in the tube to produce a compacted specimen having a length in excess of the length used in standard tests; a deformation and strength measuring station provided with means for moving said specimen out of said tube to cause a predetermined length of specimen to project beyond the end of said tube, means for applying pressure longitudinally of said specimen to break the specimen, and means for measuring deformation and strength of said specimen under pressure; a carrier for said tube and means for indexing said carrier to move said tube successively from said filling station to said ramming station to said deformation and strength measuring station and back to said filling station.

16. Apparatus as defined in claim 15 in which the means for adding water includes a valve, means for measuring the temperature of sand in the container, and control means responsive jointly to the temperature of the sand and the deformation to open the valve for adding water to the sand if its temperature and deformation indicate a water deficiency.

17. Apparatus as defined in claim 15 in which the means for adding water includes a valve, means for measuring the temperature of sand in the container, and control means responsive jointly to the temperature of the sand and the strength to open the valve for adding water to the sand if the measurement of its temperature and strength indicate a water deficiency.

18. Apparatus as defined in claim 16, said control means comprising, a timer controlling said valve to hold said valve open for a predetermined interval, and means responsive to initiation of operation of said deformation measuring means to initiate operation of said timer.

19. Apparatus for preparing a test specimen of moist sand and measuring the permeability thereof which comprises a tube open at both ends, means for depositing within said tube a quantity of moist sand in excess of that required to produce a compacted specimen, means for compacting the sand within said tube to a predetermined degree, means for thereafter moving the compacted sand longitudinally of the tube to cause a portion of the compacted sand to project beyond the end of the tube and to leave a column of compacted sand within the tube having a length equal to the standard test length employed in measuring permeability, sealing means insertable into the open end of the tube for providing therewith a closed chamber, means carried by said sealing means for introducing air under pressure at a controlled rate into said chamber, and means for measuring the pressure within said chamber.

20. Automatic equipment for controlling the moisture content of a foundry sand mixture which comprises means for measuring the temperature of the mixture including a first cam movable to a position dependent on temperature of the mixture, means for measuring deformation of a specimen of the mixture under mechanical pressure including a second cam movable to a position dependent on the deformation of the specimen, an electrically actuated valve controlling addition of liquid to said mixture, means for opening and closing said valve periodically, a control circuit for said valve including switch means responsive jointly to mixture temperature and deformation and having portions engaged by both of said cams, said switch being actuated upon attainment of a predetermined deformation value as determined by the existing mixture temperature to prevent further addition of liquid to the mixture.

21. Automatic equipment for controlling the quantity of water in a moist foundry sand mixture which comprises a container, means including a valve for adding water to said container, automatic means for preparing a series of compressed test specimens of moist sand mixture from the mixture in said container, automatic measuring means for serially testing said specimens by subjecting them to mechanical disruptive pressure, measuring means for measuring the temperature of said mixture in said container, and integrating means responsive to the results of both of said measuring means for controlling said valve.

22. Equipment as defined in claim 21, including means operable to open and close said valve periodically so long as the results of both said measuring means indicate a moisture deficiency, and in which said integrating means is operable to prevent further addition of liquid when the moisture deficiency is overcome.

23. Equipment as defined in claim 21, including means operable by each specimen testing operation to open said valve for a predetermined interval and then to close said valve, and in which said integrating means is operable to prevent further addition of liquid when the moisture deficiency is overcome.

24. Equipment as defined in claim 23, including means for adjusting the interval during which said valve remains open.

25. Apparatus for preparing a test specimen of moist sand and measuring the green deformation and permeability thereof which comprises a tube open at both ends, means for depositing within said tube a quantity of moist sand in excess of that required to produce a compacted specimen, means for compacting the sand within said tube to a predetermined degree, means for thereafter moving the compacted sand longitudinally of the tube to cause a portion of the compacted sand to project beyond the end of the tube and to leave a column of compacted sand within the tube having a length equal to the standard test length employed in measuring permeability, sealing means engageable with the open end of the tube for providing therewith a closed chamber, means carried by said sealing means for introducing air under pressure at a controlled rate into said chamber, means for measuring the pressure within said chamber, means for separating said tube and sealing means, means for advancing a piston into one end of said tube to cause a standard test length of the compacted specimen to project beyond the other end of the tube, means for applying mechanical pressure between the outer end of said specimen and said piston, and means for measuring deformation of the specimen under the mechanical pressure.

References Cited in the file of this patent

UNITED STATES PATENTS

| | | |
|---|---|---|
| 1,334,395 | Patterson | Mar. 23, 1920 |
| 1,730,893 | Lichtenberg | Oct. 8, 1929 |
| 1,931,925 | Hopkins | Oct. 24, 1933 |
| 2,005,889 | Dillon et al. | June 25, 1935 |
| 2,273,126 | McGillin | Feb. 17, 1942 |
| 2,392,637 | Boehler | Jan. 8, 1946 |
| 2,447,586 | Marshall | Aug. 24, 1948 |
| 2,504,143 | Moore | Apr. 18, 1950 |
| 2,602,461 | Walker | July 8, 1952 |
| 2,615,327 | Foust et al. | Oct. 28, 1952 |
| 2,637,212 | Moore | May 5, 1953 |
| 2,647,397 | Dietert | Aug. 4, 1953 |
| 2,709,843 | Hartley | June 7, 1954 |

FOREIGN PATENTS

| | | |
|---|---|---|
| 593,563 | Great Britain | Oct. 20, 1947 |

OTHER REFERENCES

"Foundry Core Practice," by Dietert, pub. 1950, pgs. 364–367.